April 13, 1948.　　　E. RUCH　　　2,439,635
TOOLHOLDER
Filed April 11, 1945　　　2 Sheets-Sheet 1
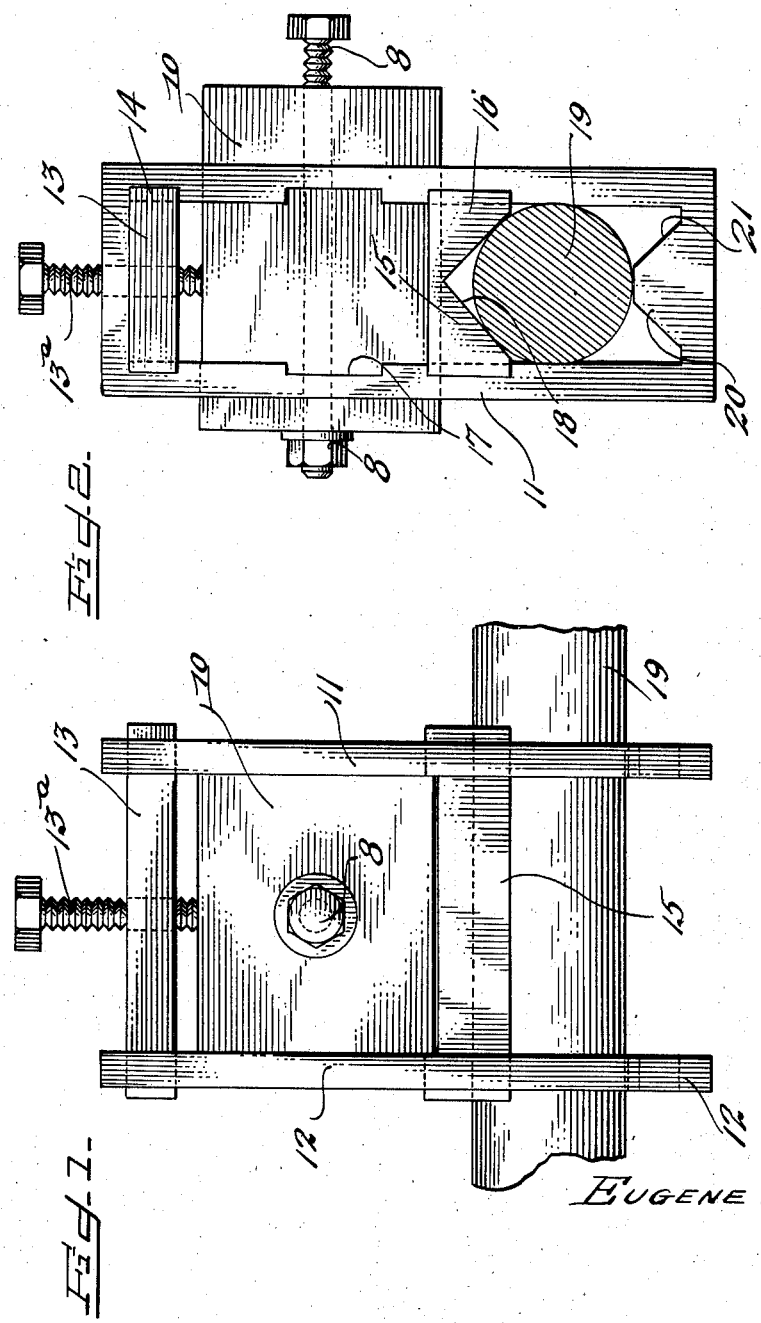

April 13, 1948.　　　　E. RUCH　　　　2,439,635
TOOLHOLDER
Filed April 11, 1945　　　2 Sheets-Sheet 2
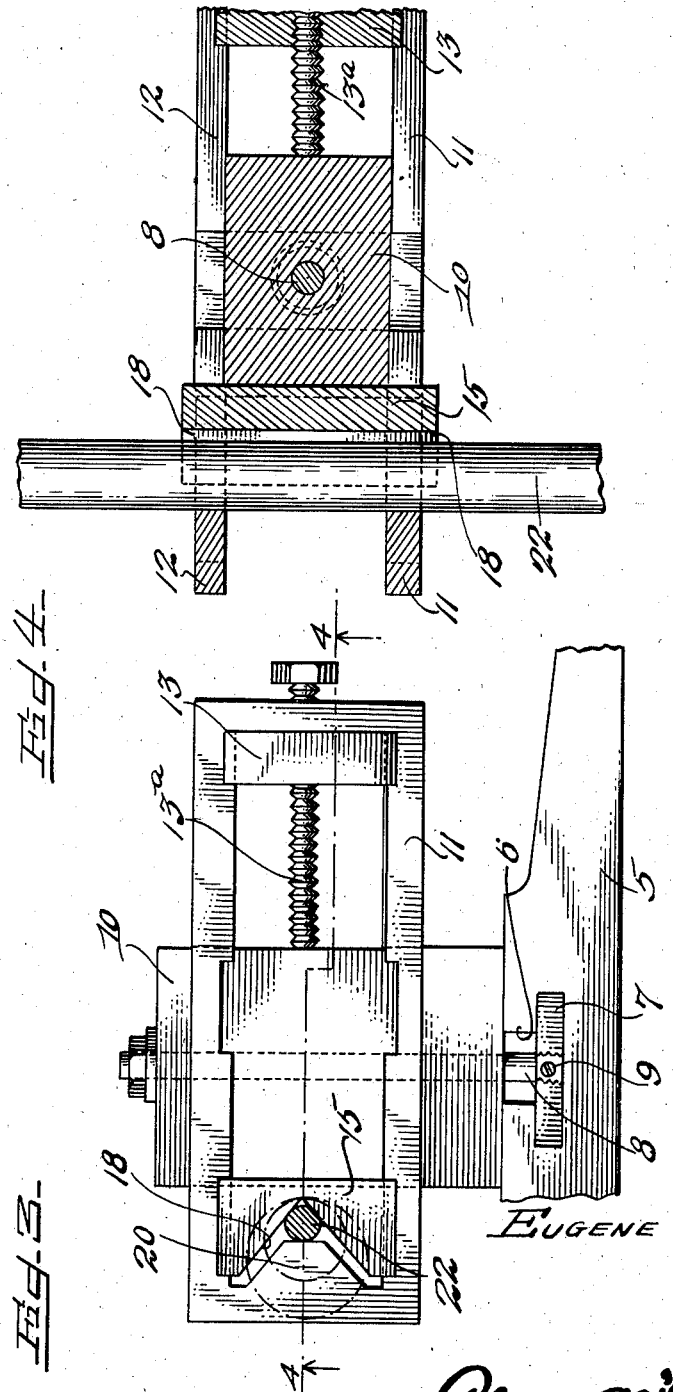
Eugene Ruch
Inventor Patented Apr. 13, 1948

2,439,635

UNITED STATES PATENT OFFICE 2,439,635

TOOLHOLDER

Eugene Ruch, Farmington, Mich.

Application April 11, 1945, Serial No. 587,741

2 Claims. (Cl. 82—36)

The present invention relates to new and useful improvements in tool holders adapted for use in lathes and other machine tools.

More specifically, the invention relates to a boring bar holder adapted to be secured to the compound rest of a lathe by means of a tool part.

An important object of the present invention is to provide a boring bar holder of this character by means of which boring bars of a wide range in diameter may be firmly clamped in position to the tool post.

A further object of the invention is to provide a boring bar holder adapted for easily and quickly mounting on a conventional form of tool post without necessitating any material changes or alterations in the construction thereof.

Another object is to provide a device of this character of simple and practical construction, which is strong and durable, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of the boring bar holder shown attached to a tool post removed from a lathe compound.

Figure 2 is a side elevational view thereof.

Figure 3 is a side elevational view showing the tool post mounted in a lathe compound and with a boring bar of relatively small diameter clamped to the post, and Figure 4 is a sectional view taken substantially on a line 4—4 of Figure 3.

Referring now to the drawings in detail wherein for the purpose of illustration I have disclosed a preferred embodiment of the invention, the numeral 5 designates a conventional form of lathe compound having a T-slot 6 in its upper surface adapted for receiving a square-shaped nut or washer 7 in the bottom portion of the slot and in which the lower end of a bolt 8 is threaded and secured in position by means of a set screw 9. The bolt 8 extends upwardly through a tool post 10 of conventional construction.

A pair of elongated rectangular clamping frames 11 and 12 are slidably mounted horizontally at opposite sides of the post 10. One end of the frames 11, 12 are connected by a cross bar 13 extending through said frames and fitted in the same for sliding along the frames for a purpose presently seen. The ends of the cross bar are provided with flanges 14 overlying the outer sides of the frames 11 and 12 to secure the frames against separating movement laterally.

A screw 13a is threaded through the cross bar 13 for bearing against one side of the post 10.

Positioned at an opposite side of the post 10 is a clamping plate 15 extending through the frames 11 and 12 and also having flanges 16 on the ends thereof overlying the outer sides of the frame members for likewise securing the frame members against separating movement laterally.

The inner side edges of the frames 11 and 12 are formed with notches 17 for receiving the flanges 16 of the clamping plate 15 in order to mount the clamping plate in the frames.

The surface of the clamping plate 15 outwardly with respect to the post 10 is formed with a V-shaped groove 18 adapted for receiving one side of a boring bar 19 inserted through the frames 11 and 12 while the adjacent ends of the frames are formed with inwardly projecting lugs 20 having tapering or inclined side edges 21 adapted to enter the groove 18 when a boring bar of relatively small diameter, such as shown at 22 in Figure 3 of the drawings is clamped in position between the clamping plate 15 and the lugs 20.

The clamping plate 15 is slidably fitted in the frames 11 and 12, in the same manner as the cross bar 13, and by adjusting the screw 13a the frames may be moved endwise across the tool post 10 so as to move the clamping lugs 20 on the ends of the frames toward or away from the clamping plate 15 to clamp the boring bar therebetween.

The cross bar 13 and clamping plate 15 may be removed from the frames 11 and 12 by aligning the flanges 14 or 16 with the notches 17 in the side of the frame.

In view of the foregoing description taken in conjunction with the accompanying drawings it is believed that a clear understanding of the construction, operation and advantages of a tool of this character will be quite apparent to those skilled in the art. A more detailed description thereof is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having thus described the invention, what I claim is:

1. A boring tool holder for the tool post of a lathe comprising a pair of elongated laterally spaced frames adapted to accommodate said post therebetween and to be moved endwise alongside the same crosswise thereof, a cross member extending through said frames and slidable along the same, said member being adapted to engage one side of the post whereby when said frames are moved endwise corresponding ends thereof are moved into clamping relation to said member to clamp the tool holder when inserted through said frames between said ends and said member, a second cross member extending through said frames at the other ends thereof and slidable along said frames into engagement with said other ends to cause endwise movement of the frames, said other member being adapted to be opposed to said post on the side thereof opposite the side with which the first named member is adapted to be engaged, and an adjusting screw threaded through said second member and adapted to be turned against said post to slide the second member against said other ends of the frames.

2. A boring tool holder for the tool post of a lathe comprising a pair of elongated laterally spaced frames adapted to accommodate said post therebetween and to be moved endwise alongside the same crosswise thereof, a cross member extending through said frames, and slidable along the same, said member being adapted to engage one side of the post whereby when said frames are moved endwise corresponding ends thereof are moved into clamping relation to said member to clamp the tool holder when inserted through said frames between said ends and said member, a second cross member extending through said frames at the other ends thereof and slidable along said frames into engagement with said other ends to cause endwise movement of the frames, said other member being adapted to be opposed to said post on the side thereof opposite the side with which the first named member is adapted to be engaged, and an adjusting screw threaded through said second member and adapted to be turned against said post to slide the second member against said other ends of the frames, said members having frame engaging flanges for preventing separation of said frames laterally.

EUGENE RUCH.

REFERENCES CITED

The following references are of record in the file of this patent:

UNITED STATES PATENTS

| Number | Name | Date |
|---|---|---|
| 767,317 | Strand | Aug. 9, 1904 |
| 1,089,635 | Gibbs | Mar. 10, 1914 |
| 1,332,731 | Krieger | Mar. 2, 1920 |